(12) United States Patent
Zhu et al.

(10) Patent No.: US 10,468,806 B2
(45) Date of Patent: Nov. 5, 2019

(54) ELECTRICAL POWER OUTLET STRIP (71) Applicant: SHANUTEC (SHANGHAI) CO., LTD., Shanghai (CN)

(72) Inventors: Wenting Zhu, Shanghai (CN); Enhua Geng, Shanghai (CN); Guoxin Wu, Shanghai (CN); Jie Zhang, Shanghai (CN); Xiuyun Yi, Shanghai (CN); Quangang Zhang, Shanghai (CN); Nan Luo, Shanghai (CN)

(73) Assignee: SHANUTEC (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 15/735,617

(22) PCT Filed: Jun. 7, 2016

(86) PCT No.: PCT/CN2016/085175
§ 371 (c)(1),
(2) Date: Dec. 12, 2017

(87) PCT Pub. No.: WO2016/197927
PCT Pub. Date: Dec. 15, 2016

(65) Prior Publication Data
US 2018/0316118 A1 Nov. 1, 2018

(30) Foreign Application Priority Data

Jun. 12, 2015 (CN) ............. 2015 1 0323746
Jul. 28, 2015 (CN) ............. 2015 1 0451656
(Continued)

(51) Int. Cl.
*H01R 13/443* (2006.01)
*H01R 13/447* (2006.01)
(Continued)

(52) U.S. Cl.
CPC ....... *H01R 13/447* (2013.01); *H01R 13/5213* (2013.01); *H01R 13/631* (2013.01);
(Continued)

(58) Field of Classification Search
CPC ...... H01R 25/14; H01R 25/145; H01R 25/16; H01R 25/161; H01R 25/163; H01R 25/164; H01R 25/165
See application file for complete search history.

(56) References Cited

U.S. PATENT DOCUMENTS 2,669,632 A * 2/1954 Hammerly ............. H01R 25/14
191/23 R
5,162,616 A * 11/1992 Swaffield ............... H01R 25/14
174/70 B
(Continued)

FOREIGN PATENT DOCUMENTS

CN 2187847 Y 1/1995
CN 2205066 Y 8/1995
(Continued)

OTHER PUBLICATIONS

Search Report in Chinese Application No. 201510323746.0 dated May 25, 2016, 13 pages.
(Continued)

*Primary Examiner* — Felix O Figueroa
(74) *Attorney, Agent, or Firm* — Metis IP LLC (57) ABSTRACT

Disclosed herein is an electrical power outlet strip having a longitudinal extending housing including a base housing portion and a plurality of covers for attachment to said base housing portion along the longitudinal direction; and a plurality of electrical wires placed inside the housing. Each cover has same dimensional measurements and may be a sealing cover or a socket cover. A sealing cover has no hole for receiving an external plug. Whereas a socket cover (Continued)

provides plug holes for receiving an external plug. The electrical power outlet strip may have all sealing covers, all socket covers, or a combination of sealing covers and socket covers.

18 Claims, 8 Drawing Sheets

(30) Foreign Application Priority Data

| | | |
|---|---|---|
| Jul. 28, 2015 | (CN) | 2015 1 0452096 |
| Jun. 12, 2016 | (CN) | 2015 1 0323806 |

(51) Int. Cl.

| | |
|---|---|
| *H01R 25/14* | (2006.01) |
| *H01R 13/631* | (2006.01) |
| *H01R 25/00* | (2006.01) |
| *H01R 13/52* | (2006.01) |
| *H01R 103/00* | (2006.01) |
| *H01R 24/78* | (2011.01) |
| *H02G 3/12* | (2006.01) |
| *H02G 3/14* | (2006.01) |

(52) U.S. Cl.
CPC .......... *H01R 25/006* (2013.01); *H01R 25/14* (2013.01); *H01R 24/78* (2013.01); *H01R 2103/00* (2013.01); *H02G 3/128* (2013.01); *H02G 3/14* (2013.01)

(56) References Cited

U.S. PATENT DOCUMENTS

| | | | | |
|---|---|---|---|---|
| 5,183,406 A * | 2/1993 | Glen | ............ | H01R 25/14 439/120 |
| 5,688,132 A * | 11/1997 | Rogers | ............ | H01R 25/142 439/120 |
| 5,804,784 A | 9/1998 | Gretz | | |
| 6,089,884 A * | 7/2000 | Klaus | ............ | F21V 33/0012 362/648 |
| 6,482,018 B1 * | 11/2002 | Stekelenburg | ......... | H01R 25/14 248/300 |
| 6,497,586 B1 * | 12/2002 | Wilson | ............ | H01R 13/73 362/383 |
| 7,201,589 B2 * | 4/2007 | Jong | ............ | H01R 25/14 439/94 |
| 7,374,444 B1 | 5/2008 | Bennett | | |
| 7,442,072 B2 * | 10/2008 | Droesbeke | ......... | H01R 13/5808 439/460 |
| 7,661,966 B2 * | 2/2010 | Ohanesian | ............ | H01R 25/142 439/120 |
| 8,622,756 B2 * | 1/2014 | Smed | ............ | H01R 9/2408 439/120 |
| 2002/0084096 A1 * | 7/2002 | Chang | ............ | H01R 25/14 174/92 |
| 2003/0111250 A1 | 6/2003 | Wang | | |
| 2005/0082082 A1 * | 4/2005 | Walter | ............ | A47B 97/00 174/68.1 |
| 2011/0070754 A1 | 3/2011 | Perales Fayos | | |
| 2014/0004718 A1 | 1/2014 | Hsu | | |
| 2015/0263447 A1 * | 9/2015 | Liao | ............ | H01R 27/02 361/601 |
| 2016/0294132 A1 | 10/2016 | Zhu | | |

FOREIGN PATENT DOCUMENTS

| | | |
|---|---|---|
| CN | 2488189 Y | 4/2002 |
| CN | 201726005 U | 1/2011 |
| CN | 201732942 U | 2/2011 |
| CN | 102646886 A | 8/2012 |
| CN | 203760799 U | 8/2014 |
| CN | 203839636 U | 9/2014 |
| CN | 204391424 U | 6/2015 |
| CN | 104668280 A | 8/2015 |
| CN | 104882753 A | 9/2015 |
| CN | 104901099 A | 9/2015 |
| CN | 104993296 A | 10/2015 |
| CN | 204696394 U | 10/2015 |
| CN | 204720643 U | 10/2015 |
| CN | 204720718 U | 10/2015 |
| CN | 204720727 U | 10/2015 |
| CN | 204858106 U | 12/2015 |
| EP | 1962388 A2 | 8/2008 |
| JP | 2009026668 A | 2/2009 |
| JP | 4882897 B2 | 2/2012 |
| WO | 2004/054045 A1 | 6/2004 |
| WO | 2008/132593 A3 | 11/2008 |
| WO | 2008132593 A2 | 11/2008 |
| WO | 2016205985 A1 | 12/2016 |
| WO | 2017016324 A1 | 2/2017 |

OTHER PUBLICATIONS

Search Report in Chinese Application No. 201510323806.9 dated May 24, 2016, 14 pages.
Search Report in Chinese Application No. 201510451656.X dated Jan. 24, 2017, 17 pages.
Search Report in Chinese Application No. 201510451656.X dated Sep. 18, 2017, 20 pages.
Search Report in Chinese Application No. 201510452096.X dated Nov. 14, 2016, 14 pages.
International Search Report in PCT/CN2016/085175 dated Sep. 12, 2016, 4 pages.
Written Opinion in PCT/CN2016/085175 dated Sep. 18, 2016, 5 pages.

* cited by examiner

ELECTRICAL POWER OUTLET STRIP

CROSS-REFERENCE TO RELATED APPLICATIONS

This application is a U.S. national stage of International Application No. PCT/CN2016/085175, filed on Jun. 7, 2016, which claims priority to Chinese Application No. 201510323746.0 filed on Jun. 12, 2015, and Chinese Application No. 201510323806.9 filed on Jun. 12, 2015, and Chinese Application No. 201510451656.X filed on Jul. 28, 2015, and Chinese Application No. 201510452096.X filed on Jul. 28, 2015, the entire contents of which are incorporated herein by reference.

TECHNICAL FIELD

The present disclosure relates to an electrical power outlet strip.

BACKGROUND

Conventional electrical power outlets or outlet strips have fixed plug holes that are generally left open. If water leaks into those open plug holes, it will cause electrical accident that may lead to property damage or even bodily harm to humans. The limited number of plug holes on a conventional electrical outlet or outlet strip limits the plug-in locations, which further limits the locations and positioning of household appliances. For example, if a household appliance is located relatively far away from the plug holes, it may not be directly plugged into the outlet or outlet strip with its own power cord. In this situation, an extra power cord or outlet strip is needed.

SUMMARY

It is an object of the present disclosure to provide a safer and more convenient electrical power outlet strip. The electrical power outlet strip changes the conventional way of electrical wiring in a house. It can be installed as part of the baseboard or floor and extend to all the rooms in a house. As such, it can provide more power outlets for supplying electrical power to electrical appliances and devices.

Particularly, the electrical power outlet strip is very useful in commercial buildings where a lot of power consumption appliances and devices are installed. The electrical power outlet strip makes office space safer and cleaner. When used in an exhibition setup, the electrical power outlet strip is easy and quick to install.

In some embodiments, the electrical power outlet strip comprises: a longitudinal extending housing including a base housing portion and a plurality of covers for attachment to said base housing portion along the longitudinal direction; and a plurality of electrical wires placed inside the housing.

In some embodiments, each cover has same dimensional measurements.

In some embodiments, each cover is selected from a plurality of types of covers.

In some embodiments, said plurality of types of covers includes a first type of cover having no hole through which an external plug is able to electrically connect to the plurality of wires and a second type of cover having holes through which the external plug is able to electrically connect to the plurality of wires.

In some embodiments, the electrical power outlet strip of claim 1, wherein the plurality of electrical wires are made of a conducting material.

In some embodiments, the covers are removably attached to the base housing portion.

In some embodiments, the longitudinal extending housing further includes a plurality of insulating supporting structures for supporting the plurality of electrical wires.

In some embodiments, the plurality of electrical wires comprises a hot wire, a ground wire, and a neutral wire.

In some embodiments, each cover of the plurality of covers is attached to an adjacent cover by a half shoulder tenon.

In some embodiments, a connector is installed in the longitudinal extending housing to connect the plurality of electrical wires to an electrical power source.

In some embodiments, at least one of said plurality of covers includes an extending structure formed on an outer surface of the cover.

In some embodiments, the electrical power outlet strip further comprises a wireless charger placed in the base housing portion.

In some embodiments, each cover has a peg for insertion into a hole formed in the base housing portion so that the cover is securely attached to the base housing portion.

In some embodiments, the base housing portion comprises an insertion groove and each cover has an edge for inserting into the insertion groove.

In some embodiments, the hole for receiving the peg is formed in the insertion groove of the base housing portion.

In some embodiments, a plurality of guiding slots is formed in the base housing portion, and wherein the guiding slots are insulated from each other.

In some embodiments, the base housing portion includes a plurality of locking holes, and each cover includes a though-hole; and wherein the electrical power outlet strip further comprises a pin for locking said corresponding cover with the base housing portion by inserting into one of the locking holes and the through hole.

In some embodiments, the plurality of electrical wires is placed at the bottoms of the guiding slots.

In some embodiments, the plurality of electrical wires is placed on the side walls of the guiding slots.

In some embodiments, the cover includes a plurality of ridges for insertion into the plurality of guiding slots and the number of the ridges is less than or equal to that of the guiding slots.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various implementations, as described in more detail below, an electrical power outlet strip is provided.

Figure 1:
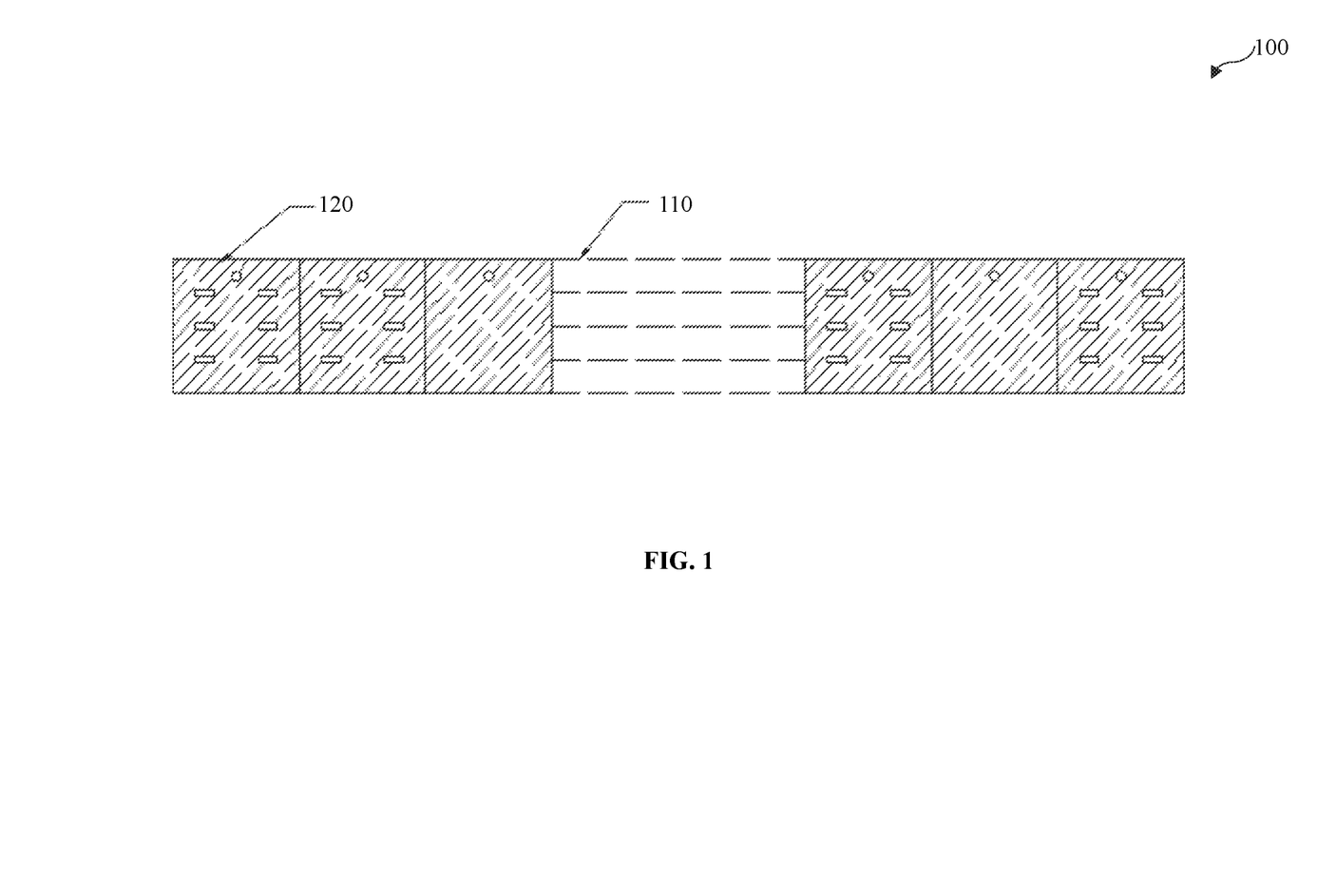
FIG. 1 illustrates an example of an electrical power outlet strip 100 in accordance with some embodiments of the disclosed subject matter.

FIG. 1 illustrates an example of an electrical power outlet strip 100 in accordance with some embodiments of the disclosed subject matter.

In some embodiments, the electrical power outlet strip 100 includes a longitudinal extending housing 110. The longitudinal extending housing 110 includes a base housing portion (not shown) and a plurality of covers 120. The plurality of covers 120 are attached to the base housing portion along the longitudinal direction. Each cover 120 matches the width of the base housing portion but multiple covers 120 are required to cover the base housing portion length wise.

The covers attached to the base housing portion protect the electrical wires inside the housing from external impacts, such as dirt, moisture, mechanic forces, water, etc. In some embodiments, the plurality of covers 120 have the same dimensional measurements. For example, the plurality of covers may be uniformly shaped and have the same width and length.

In another embodiment, each cover may be selected from a plurality of types of covers. For example, a first type of cover is a sealing cover, which has no through holes for receiving a plug after it is attached to the base housing portion. A second type of cover is a socket cover, which has through holes for receiving a plug after it is attached to the base housing portion.

In some embodiments, a cover may be removably attached to the base housing portion. For example, a sealing cover may be removably attached to the base housing portion. When needed, the sealing cover is removed and a plug can be inserted into the base housing portion to electrically connect to the wires in the housing. When the plug is unplugged, the sealing cover can be reattached to the base housing portion to cover the wires. Furthermore, because each cover may be removed from and reattached to the base housing portion, a user may replace or rearrange the plurality of covers 120 of the electrical power outlet strip 100 to create a different configuration.

In some embodiments, all covers attached to the base housing portion of an electrical power outlet strip are socket covers. As a result, the electric power outlet strip can provide a maximum number of socket outlets. In yet another embodiment, all covers of an electrical power outlet strip are sealing covers, providing no socket outlet for connection.

In some embodiments, a mixture of sealing cover(s) and socket cover(s) may be used for attaching to a base housing portion of an electrical power outlet strip, leaving certain part of the outlet strip sealed and other part of the outlet strip open for receiving external plugs.

Figure 2:
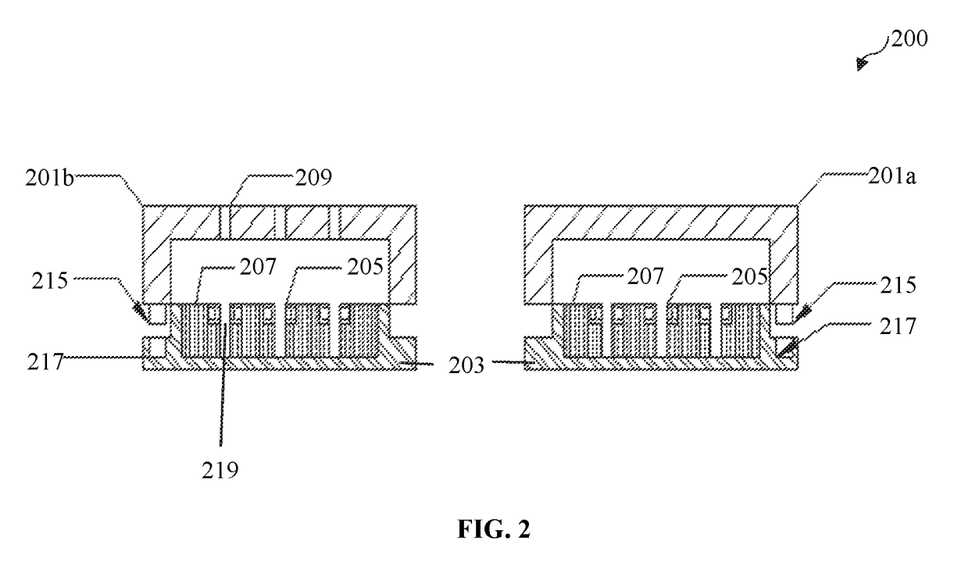
FIG. 2 includes two cross-section views of an exemplary electrical power outlet strip 200 in accordance with some embodiments of the disclosed subject matter.

FIG. 2 includes two cross-section views of an exemplary electrical power outlet strip 200 in accordance with some embodiments of the disclosed subject matter. As shown, the electrical power outlet strip includes a base housing portion 203, a sealing cover 201*a*, and a socket cover 201*b*. The socket cover 201*b* has a plurality of through holes 209 for receiving an external plug. Both the sealing cover 201*a* and the socket cover 201*b* have a peg 215. Each peg 215 may be inserted into a corresponding hole 217 formed on the base housing portion 203 so that the corresponding cover 201*a* or 201*b* is securely attached to the base housing portion 203. The peg 215 and the corresponding hole 217 may be formed in any proper shape, including but not limited to cylinder, cuboid, etc. As shown, each cover is shaped to have the same width as the base housing portion 203. During installation, an installer can place a cover over the base housing portion and slightly move the cover along the longitudinal direction of the base housing portion to allow the cover's peg to find and engage the corresponding hole on the base housing portion. As such, the installation process is made easier and quicker.

In some embodiments, the base housing portion 203 is installed on a wall (e.g., in the baseboard area) or on a floor, and may be extended to all rooms of a house.

The base housing portion 203 includes a plurality of insulating supporting structures 207. Each supporting structure 207 has two side walls and at least one side wall has a groove for installing an electrical wire 205. In addition, every two adjacent supporting structures 207 have a gap 219 in between. Each gap 219 is directly underneath a through hole 209 and matches the width of a plug's prong. A plug's prongs can be inserted into the gaps 219 through the socket cover 201*b* to electrically connect to the wires 205.

The distances between the plurality of electrical wires 205 and the corresponding though holes 209 are such that a plug's prongs are able to electrically connect to the plurality of electrical wires 205 though the socket cover 201*b*. Thus, they may be the same or different. In some embodiments, the plurality of electrical wires 205 include a hot wire, a ground wire, and a neutral wire. A connector is installed in the longitudinal extending housing 110 to connect the plurality of electrical wires 205 to an electrical power source.

In some embodiments, the method for manufacturing the through holes 209 includes but is not limited to chiseling, laser cutting, integral forming, or any combination thereof. The supporting structures 207 may be made of any suitable material, such as wood, plastic, fiber, any other non-conductive material, or any combination thereof. The electrical wires 205 may be made of any conducting material, such as metal, alloy, etc.

In another embodiment, the shapes of the through holes 209 include but are not limited to rectangle, circle, polygon, or any combination thereof.

The materials for manufacturing the base housing portion 203, the supporting structures 207, and the plurality of covers 201 may be the same or different. In another embodiment, the base housing portion 203, the supporting structures 207, and the plurality of covers 201 attaching to the base housing portion 203 may insulate the plurality of electrical wires from the outside environment.

Figure 3:
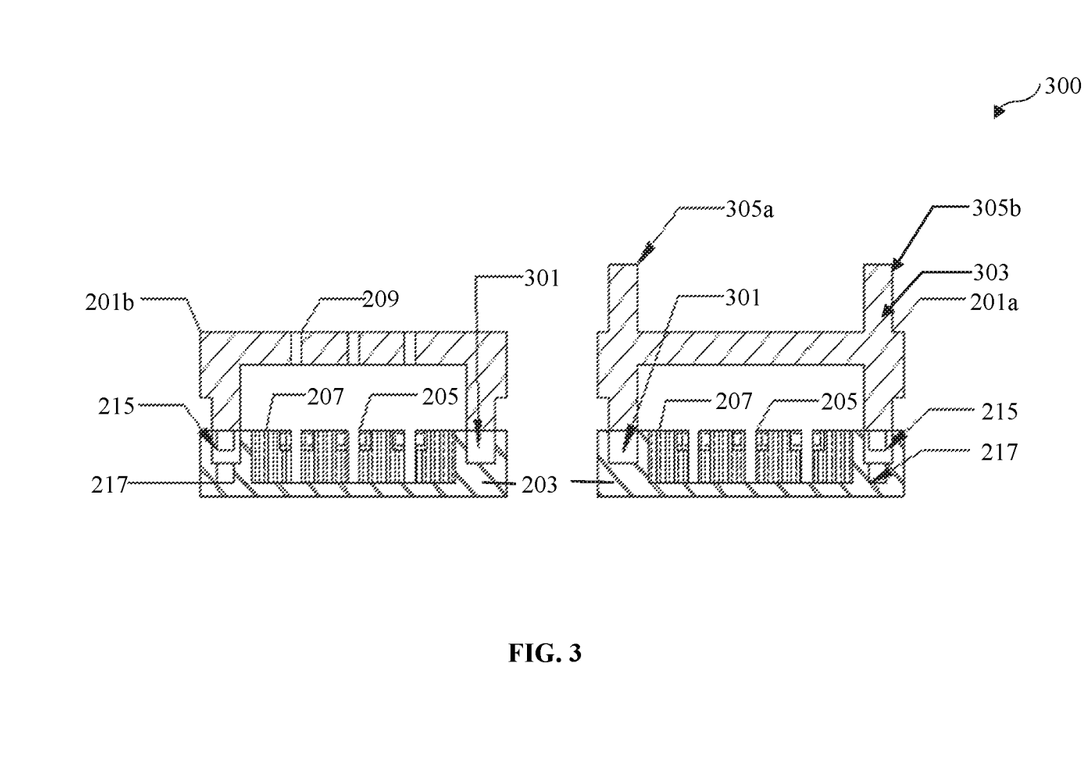
FIG. 3 includes two cross-section views of an exemplary electrical power outlet strip 300 in accordance with some embodiments of the disclosed subject matter.

FIG. 3 includes two cross-section views of an exemplary electrical power outlet strip 300 in accordance with some embodiments of the disclosed subject matter. As shown, the electrical power outlet strip 300 is similar to the electrical power outlet strip 200 (discussed above with reference to FIG. 2), except that certain components and features are modified or added.

For example, the base housing portion 203 has two insertion grooves 301 formed on each side of the base housing portion 203 along the longitudinal direction. The holes 217 are formed at the bottom of the insertion grooves. When attaching a cover, such as the sealing cover 201a or the socket cover 201b, to the base housing portion 203, part of the edges of the cover is inserted into the insertion grooves 301. Meanwhile, the peg 215 formed on an edge of the cover is inserted into the corresponding hole 217, further securing the attachment of the cover to the base housing portion 203. As such, it is hard for the cover to fall off from the base housing portion 203 even when the cover is hit by an external force, preventing any accident caused by unwanted exposure of the electrical wires. Also, the sealing cover 201a may have an extending structure 303 formed on its outer surface. In some embodiments, a wireless charger is installed in the base housing portion 203 for wirelessly charging an electronic device, such as a mobile phone or tablet computer. In this situation, the extending structure 303 may be used for supporting such a device.

In some embodiments, the extending structure 303 includes a plurality of hathpaces or beams 305a-b that protrude from an outer surface of the cover 201. For example, the extending structure 303 includes two hathpaces or beams 305a-b. The method for manufacturing the supporting structure 303 may include but is not limited to chiseling, laser cutting, integral forming, or any combination thereof. The supporting structure 303 may be manufactured using any suitable material, such as wood, plastic, fiber, or any combination thereof.

Figure 4A:
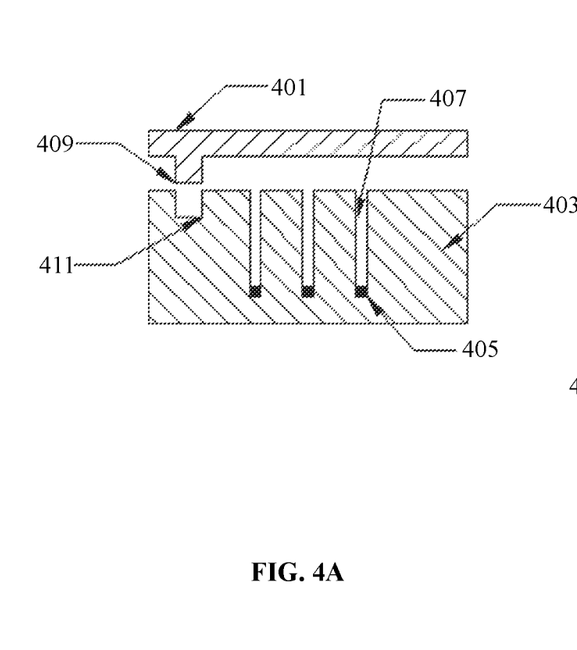
FIG. 4A and FIG. 4B each illustrate a cross-section view of an exemplary electrical power outlet strip 400 in accordance with some embodiments of the disclosed subject matter.

FIG. 4A illustrates a cross-section view of an exemplary electrical power outlet strip 400 in accordance with some embodiments of the disclosed subject matter. As shown, the electrical power outlet strip 400 includes a base housing portion 403, a cover 401. In one embodiment, the base housing portion 403 is a rectangular block. The base housing portion 403 includes a top surface 415, a bottom surface 417, and two side walls 419 and 421.

Furthermore, the base housing portion 403 includes a plurality of guiding slots 407 formed in parallel to the side walls 419 and 421. An electrical wire 405 is installed at the bottom of each guiding slot. The depth of each guiding slot and the distances among these slots are configured to match a plug's prongs so that the plug can be fully inserted into these slots and its prongs are electrically connected to the electrical wires 405.

In one embodiment, the cover 401 may be removably attached to the base housing portion 403 via a peg 409, formed on the cover 401, and a hole 411, formed on the base housing portion 403. When the cover 401 is attached to the base housing portion 403, it covers the plurality of guiding slots 407 and the plurality of electrical wires 405 installed inside the slots. The cover 401 may be removed to allow a plug to be inserted into the slots. The size of the cover 401 may be designed such that when it is removed the exposed slots 407 may be fully covered by such a plug.

In another embodiment, the guiding slot 407 has two side walls and a bottom. The two side walls are parallel to each other and are perpendicular to the top surface 415 of the base housing portion 403.

Figure 4B:
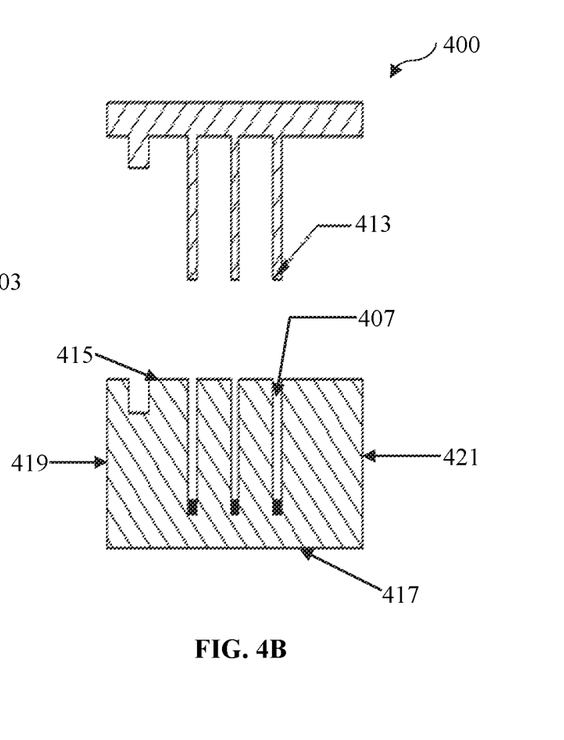

As shown in FIG. 4B, the cover 401 may include a plurality of ridges 413. The number of the ridges 413 may be less than or equal to the number of guiding slots 407. When the cover 401 is attached to the base housing portion 403, the ridges 413 are inserted into the guiding slots 407. As such, they can secure the attachment more firmly to prevent the cover from falling off the base housing portion even when there is an external force hitting the cover.

In some embodiments, the lengths of the ridges 413 match the depths of the guiding slots 407 so that the cover 401 may be attached to and seal the base housing portion 403. The ridges 413 may have the same structure or different structures. And the shape of the structure of each ridge 413 may include but is not limited to cuboid or cylinder.

Figure 5A:
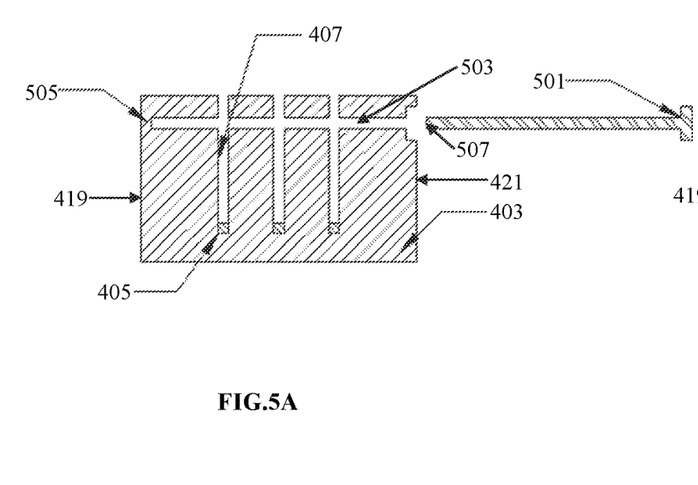
FIG. 5A and FIG. 5B each illustrate a cross-section view of an exemplary electrical power outlet strip 500 in accordance with some embodiments of the disclosed subject matter.

FIG. 5A illustrates a cross-section view of an exemplary electrical power outlet strip 500 in accordance with some embodiments of the disclosed subject matter. As shown, the electrical power outlet strip 500 includes a cover 501, a base housing portion 403, a plurality of electrical wires 405 and other suitable components (not shown) in accordance with the disclosed subject matter.

In some embodiments, an insertion groove 503 parallel to and near the top surface 415 of the base housing portion 403 is created with an opening on the side wall 421. The insertion groove 503 extends along the longitudinal direction of the longitudinal extending housing 110 and intersects with all of the guiding slots 407. As shown, a sealing cover 501 can be inserted into the insertion groove 503 to cover the guiding slots 407 and the electrical wires installed inside the slots. The insertion groove 503 may be a through groove from one side wall 421 to the other side wall 419 of the base housing portion 403. Alternatively, the insertion groove 503 has a solid bottom. In either case, a positioning structure, such as a small beam 505, may be formed at the bottom of the insertion groove 503. The cover 501 has a corresponding notch 507 formed on the edge to be inserted into the groove. When the cover 501 is inserted into the groove, the beam 505 fits into the notch 507, therefore locking the cover 501 into a proper position.

Figure 5B:
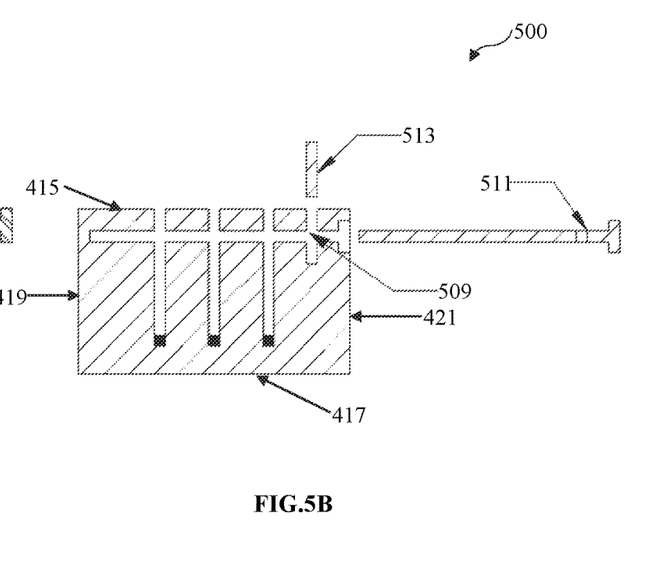
Figure 5C:
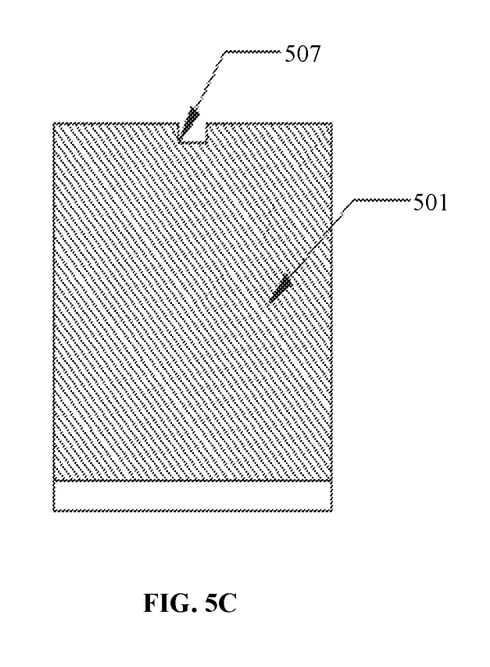
FIG. 5C shows a front view of the cover 501 of the electrical power outlet strip 500 shown in FIGS. 5A-B.

FIG. 5C shows a front view of the cover 501 and the notch 507 formed on the edge to be inserted into the groove. The notch 507 may have a square shape or other shape that matches the shape of the beam 505.

In some embodiments, as shown in FIG. 5B, the base housing portion 403 has a locking hole 509 and the cover 501 has a through hole 511. When the cover 501 is fully inserted into the groove 503, the locking hole 509 is aligned to the through hole 511. A pin 513 is inserted into the locking hole 509 and through hole 511 to firmly attach the cover to the base housing portion. The shape of the pin 513 matches that of the locking hole 509 and through hole 511.

Figure 6A:
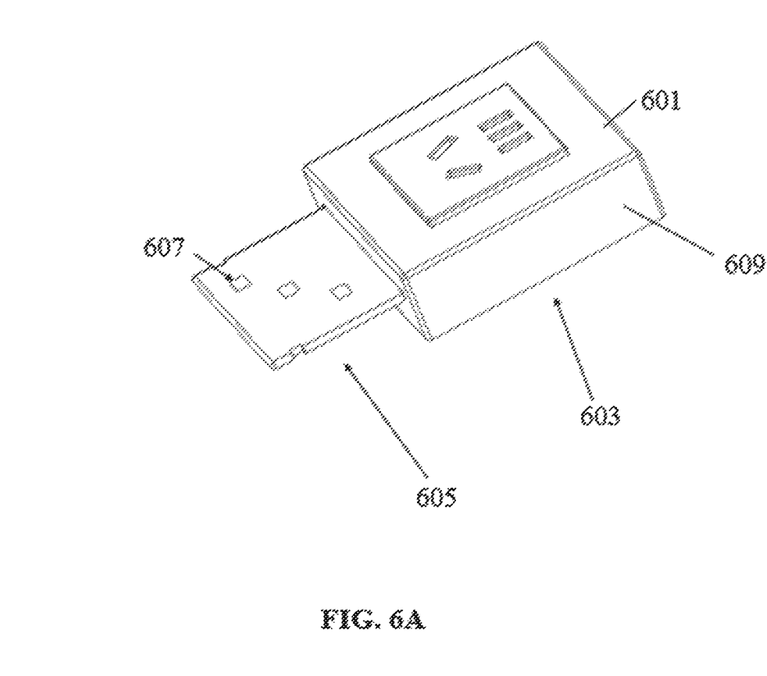
FIG. 6A illustrates a perspective view of an exemplary external plug according to some embodiments of the present disclosure.

FIG. 6A illustrates a perspective view of an exemplary external plug according to some embodiments of the present disclosure. As shown in FIG. 6A, the external plug includes a plug body 603 and a plug board 605. The plug board 605 may be slided or folded into the plug body 603 to prevent it from being damaged when not in use. In some embodiments, the plug board 605 may include a plurality of elastic contacts 607 placed on at least one side of its surface. The elastic contacts 607 are made of a conducting material such as metal, alloy, etc. Merely, by way of example, the plug board 605 as shown in FIG. 6A has three elastic contacts 607 placed on one side of its surfaces. More particularly, the elastic contacts 607 may be positioned so that when the external plug is inserted in a guiding slot in the present disclosure, the elastic contacts are electrically connected to the electrical wires placed in a guiding slot.

The external plug illustrated in FIG. 6A also has a socket part. The plug body 603 has a back shell 609 and a front cover 601 detachably connected to the back shell 609. A socket core (not shown in FIG. 6A) and its conductors are electrically connected to the elastic contacts through electrical wires or the like inside the plug body 603. For example, co-pending PCT application No. PCT/CN2016/085142, titled "A MOVABLE SOCKET ASSEMBLY," filed on Jun. 7, 2016 describes the details of such a plug. The contents of PCT application No. PCT/CN2016/085142 are hereby incorporated by reference.

Figure 6B:
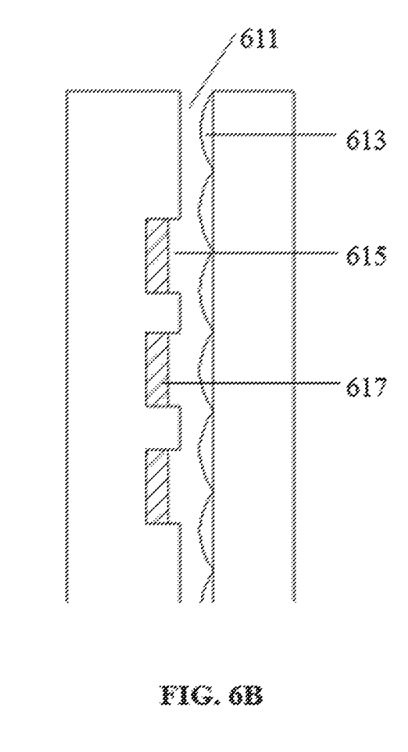
FIG. 6B illustrates a cross-section view of a guiding slot in accordance with some embodiments of the disclosed subject matter.

FIG. 6B illustrates a cross-section view of a guiding slot in accordance with some embodiments of the disclosed subject matter. As shown the guiding slot 611 includes a plurality of embossments 613, a plurality of concave slots 615 and a plurality of electrical wires 617 and other suitable components (not shown) in accordance with the disclosed subject matter.

The guiding slot 611 is another design of a guiding slot for receiving an external plug such as the one shown in FIG. 6A. In some embodiments, the three rectangular-shaped concave slots 615 may be formed on a side wall of the guiding slot 611. Three flat electrical wires are placed inside said three rectangular concave slots 615, respectively. The plurality of elastic embossments 613 are placed on an opposite side wall of the guiding slot 611.

When plug board 605 is inserted into the guiding slot 611, the elastic embossment 613 may slightly deform form their original shape to let the plug board 605 to go through and when the plug board 605 reaches the position where the three elastic contacts 607 can fit into the three concave slots 615, the deformed elastic embossments 613 pushes and holds these contacts 607 into the concave slots 615 so that they are electrically connected to the electrical wires 617 in the concave slots 615.

In some embodiments, an electrical power outlet strip may include a guiding slot 611. The three electrical wires in a guiding slot 611 include a hot wire, a ground wire, and a neutral wire. And from top to bottom, the three electrical wires are a neutral wire, a ground wire and a hot wire. The three electrical wires may be arranged in other sequences. In another embodiment, an electrical power outlet strip may include a plurality of guiding slots 611. For example, an electrical power outlet strip may include three guiding slots 611. The number of electrical wires in each guiding slot 611 may be the same of different.

Figure 7:
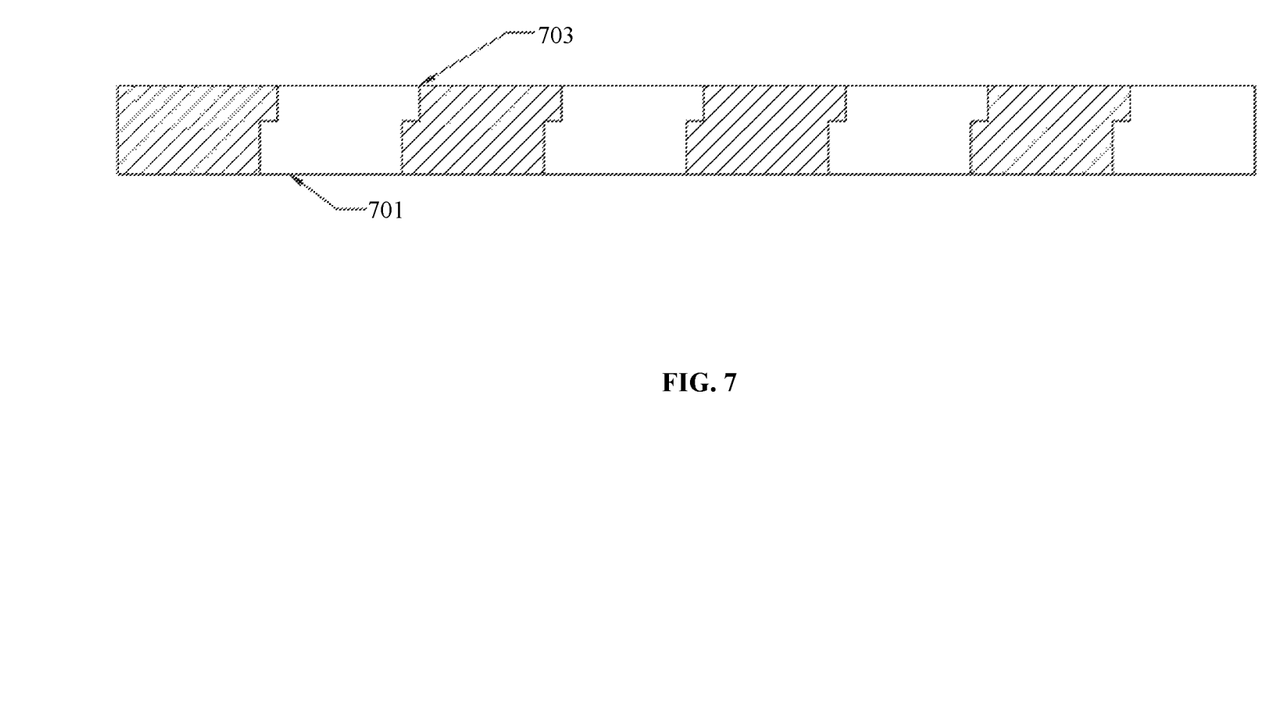
FIG. 7 is cross-section view of a plurality of covers attached to each other in accordance with some embodiments of the disclosed subject matter.

FIG. 7 is cross-section view of a plurality of covers attached to each other in accordance with some embodiments of the disclosed subject matter. As shown, a cover 701 is attached to its adjacent cover by a half shoulder tenon 703, which can more tightly seal the gap between the two covers.

This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. It should be appreciated for those skilled in the art that the electrical power outlet strip is not limited to the methods described above.

What is claimed is:

1. An electrical power outlet strip, comprising:
   a longitudinal extending housing including a base housing portion, the base housing portion including two longitudinal extending side walls, the longitudinal extending side wall including an insertion groove,
   a plurality of electrical wires made of a conducting material parallelly and longitudinally placed inside the housing comprising a hot wire, a ground wire, and a neutral wire each supported by and spaced apart by spaced apart insulating supporting structures, and
   a plurality of covers for removable attachment to said base housing portion along the longitudinal direction including a first type of cover having no hole through which an external plug is able to electrically connect to the plurality of electrical wires and a second type of cover having two sets of three holes through which the external plug is able to electrically connect to the plurality of electrical wires, wherein three of the holes of each set of the second type of cover substantially align with each other such that a cross section of the strip perpendicular to the longitude of the housing along the holes will show each of the three holes of each set corresponds to each of the electrical wires, and
   wherein each cover has a same dimensional measurement,
   wherein each cover of the plurality of covers has an edge for inserting into the insertion groove and a peg formed on the edge for inserting into a hole formed at the bottom of the insertion groove so that the cover is securely attached to the base housing portion.

2. The electrical power outlet strip of claim 1, wherein a connector is installed in the longitudinal extending housing to connect the plurality of electrical wires to an electrical power source.

3. The electrical power outlet strip of claim 1 further comprising a wireless charger placed in the base housing portion.

4. The electrical power outlet strip of claim 1, wherein the spaced apart insulating supporting structures comprises plurality of guiding slots formed in the base housing portion and insulated from each other.

5. An electrical power outlet strip, comprising:
   a longitudinal extending housing including a base housing portion, the base housing portion including two longitudinal extending side walls, the longitudinal extending side wall including an insertion groove,
   a plurality of electrical wires made of a conducting material longitudinally placed inside the housing and spaced apart, and
   a plurality of covers for removable attachment to said base housing portion along the longitudinal direction, the plurality of covers including a second type of cover having at least three holes through which an external plug is able to electrically connect to the plurality of electrical wires,
   wherein each cover of the plurality of covers has an edge for inserting into the insertion groove and a peg formed on the edge for inserting into a hole formed at the bottom of the insertion groove so that the cover is securely attached to the base housing portion.

6. The electrical power outlet strip of claim 5, wherein each cover has a same dimensional measurement.

7. The electrical power outlet strip of claim 5, wherein the plurality of electrical wires comprises a hot wire, a ground wire, and a neutral wire.

8. The electrical power outlet strip of claim 5, wherein each cover of the plurality of covers is attached to an adjacent cover by a half shoulder tenon.

9. The electrical power outlet strip of claim 5, wherein a connector is installed in the longitudinal extending housing to connect the plurality of electrical wires to an electrical power source.

10. The electrical power outlet strip of claim 5, wherein at least one of said plurality of covers includes an extending structure formed on an outer surface of the cover.

11. The electrical power outlet strip of claim 5 further comprising a wireless charger placed in the base housing portion.

12. The electrical power outlet strip of claim 5, wherein at least three of the holes of the second type of cover substantially align with each other such that a cross section of the strip perpendicular to the longitude of the housing along the holes will show each of the three holes corresponds to each of the plurality of electrical wires.

13. The electrical power outlet strip of claim 5, wherein the base housing portion includes a plurality of locking holes, and each cover includes a though-hole, and wherein the electrical power outlet strip further comprises a pin for locking said corresponding cover with the base housing portion by inserting into one of the locking holes and the through hole.

14. The electrical power outlet strip of claim 5, wherein the base housing portion includes a plurality of insulating supporting structures, every two adjacent supporting structures of the plurality of insulating supporting structures forming a gap in between, wherein the plurality of insulating supporting structures supports the plurality of electrical wires, or the plurality of electrical wires are installed at the bottom of the gap.

15. The electrical power outlet strip of claim 14, wherein the gap is underneath a hole of the at least three holes and matches the width of a prong of the external plug.

16. The electrical power outlet strip of claim 14, wherein the plurality of electrical wires is placed on a side wall of the gap.

17. The electrical power outlet strip of claim 14, wherein the plurality of covers further includes a first type of cover having no hole through which the external plug is able to electrically connect to the plurality of electrical wires.

18. The electrical power outlet strip of claim 17, wherein the first type of cover includes a plurality of ridges for insertion into the plurality of gaps and the number of the ridges is less than or equal to that of the gaps.

* * * * *